Sept. 11, 1934. J. C. GLENZER Re. 19,312
TOOL DRIVER
Original Filed March 7, 1929
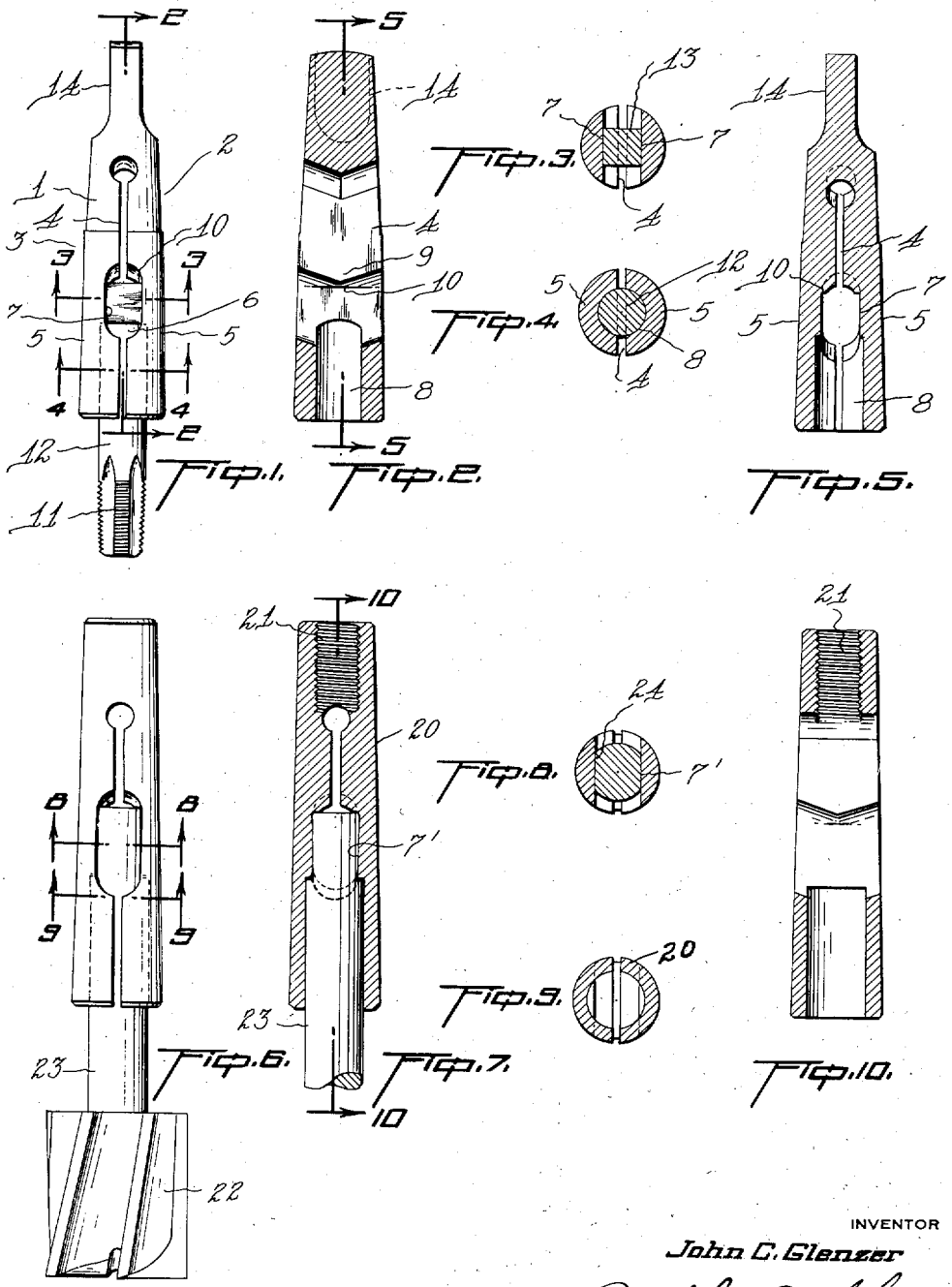
INVENTOR
John C. Glenzer
BY
ATTORNEYS Reissued Sept. 11, 1934

Re. 19,312

UNITED STATES PATENT OFFICE 19,312

TOOL DRIVER

John C. Glenzer, Detroit, Mich.

Original No. 1,863,107, dated June 14, 1932, Serial No. 344,958, March 7, 1929. Application for reissue June 21, 1934, Serial No. 731,727

2 Claims. (Cl. 279—103)

The present invention pertains to an improvement of the tool driver shown in my Patent No. 1,304,473 of May 20, 1919.

In the practical embodiment of the patented device, the end of the tool rides against the curved end of a slot which bifurcates the holder. In so doing, the tool end tends to spread the bifurcations, thus resisting an opposing tendency of the bifurcations to be clamped snugly on the shank of the tool by means of the socket member into which the holder is driven.

The object of the present invention is to overcome this difficulty and is accomplished by the formation of projections or abutments extending into the path of the inserted tool well in advance of the blind end of the slot, whereby the tool end is engaged and positively stopped by these projecting members before reaching the end of the slot.

The invention is fully disclosed by way of example in the following description and in the accompanying drawing in which Figure 1 is an elevation of the improved tool driver showing a tap received therein;

Figure 2 is a longitudinal section of the driver on the line 2—2 of Figure 1;

Figures 3 and 4 are sections on the lines 3—3 and 4—4 respectively of Figure 1;

Figure 5 is a longitudinal section of the driver on the line 5—5 of Figure 2;

Figure 6 is an elevation of a somewhat modified form of driver for receiving a counter-bore tool;

Figure 7 is a longitudinal section thereof;

Figures 8 and 9 are sections on the lines 8—8 and 9—9 respectively of Figure 6 the tool being omitted; and Figure 10 is a longitudinal section of the driver upon the line 10—10 of Figure 7.

Reference to these views will now be had by use of like characters which are employed to designate corresponding parts throughout.

The driver consists of a body member 1 having conical surfaces 2 and 3 and slotted longitudinally and diametrically at 4 to provide a pair of clamping jaws 5 as set forth in the above mentioned patent. The slot is enlarged between the ends thereof to form a recess 6 extending through the body and having opposed straight facets 7, as shown in Figure 3, for a purpose which will presently appear. The recess is also continued below the facets in the nature of an opening 8 of circular cross section and extending to the receiving end of the body as clearly illustrated in Figures 2 and 4, without, however, altering the width of the slot at the lower end of the body.

The widened part 6 of the slot is formed with a tool which leaves shoulders 9 pointed downwardly from the upper ends of the facets. The points of the shoulders are flattened as at 10 to form projecting faces or seats extending into the recess and at right angles to the facets 7.

The driver shown in Figures 1 to 5 is designed to receive a tap 11 having a cylindrical shank 12 which fits into the opening 8. The upper end of the shank is squared as at 13 to form four faces, any pair of which is engageable by the facets 7 to constitute a positive drive between the driver and the tool. On being inserted into the driver, the end of the tool seats against the abutments or square shoulders 10 and is thus prevented from being driven farther into the driver and spreading the jaws even though it be struck with a mallet at its working end.

The upper end of the driver is formed as a key 14 which fits into the socket or spindle of the machine.

In Figures 6 to 10 is shown a somewhat modified construction for reception in a different type of machine. In this case the entering end of the body 20 is tapped as at 21 so that it may be reached by a threaded rod and thus drawn into the chuck or spindle of the machine. This style of driver receives a counterbore tool 22 having a cylindrical shank 23 with only one pair of opposed facets 24 at its entering end. These facets are received between and engaged by the facets 7′ within the body 20 in the manner already set forth in connection with Figures 1 to 5.

Although specific embodiments of the invention have been illustrated and described, it will be apparent that various alterations in the details of construction may be made without departing from the spirit of the invention as indicated by the appended claims.

What I claim is:

1. In combination, a tool driver comprising a one-piece tapered body adapted for direct insertion in the tool holder of a drill press and having a slot extending diametrically through and bifurcating the larger major end portion thereof to provide a pair of opposed jaws adapted to clamp a tool therebetween when inserted in said tool holder, said slot being enlarged between the ends thereof to form a recess extending through the body and having opposed straight side facets, said recess being enlarged and continued below said facets in the form of a circular axial opening to the tool receiving end of the body, said body having shoulders in the enlarged portion of the slot pointed downwardly from the upper ends of said facets, the points of said shoulders being flattened to form projecting faces extending into said recess at right angles to said facets, and a tool having a cylindrical shank adapted to fit into said circular axial opening, the upper end of said shank being provided with flat facets at opposite sides thereof engageable by the straight side facets of the body to provide a positive drive between the driver and the tool, said tool shank being adapted to seat against said projecting faces of the driver to prevent further movement of said shank into the driver and spreading of the jaws of the driver thereby.

2. A tool driver comprising a one-piece tapered body adapted for direct insertion in the tool holder of a drill press and having a slot extending diametrically through and bifurcating the larger major end portion thereof to provide a pair of opposed jaws adapted to clamp a tool therebetween when inserted in said holder, said slot being enlarged between the ends thereof to form a recess extending through the body and having opposed straight side facets, said recess being enlarged and continued below said facets in the form of a circular axial opening to the receiving end of the body for reception of the cylindrical shank of a tool, the straight side facets of the body being adapted to cooperate with flat facets at opposite sides of the upper end of the tool shank to provide a positive drive between the driver and the tool, said body having shoulders in the enlarged portion of the slot pointed downwardly from the upper ends of said facets, the points of said shoulders being flattened to form projecting faces extending into said recess at right angles to said facets, said projecting faces of the driver being adapted to have the upper end of the tool shank seat against the same to prevent further movement of the tool shank into the driver and spreading of the jaws of the driver thereby.

JOHN C. GLENZER.